UNITED STATES PATENT OFFICE.

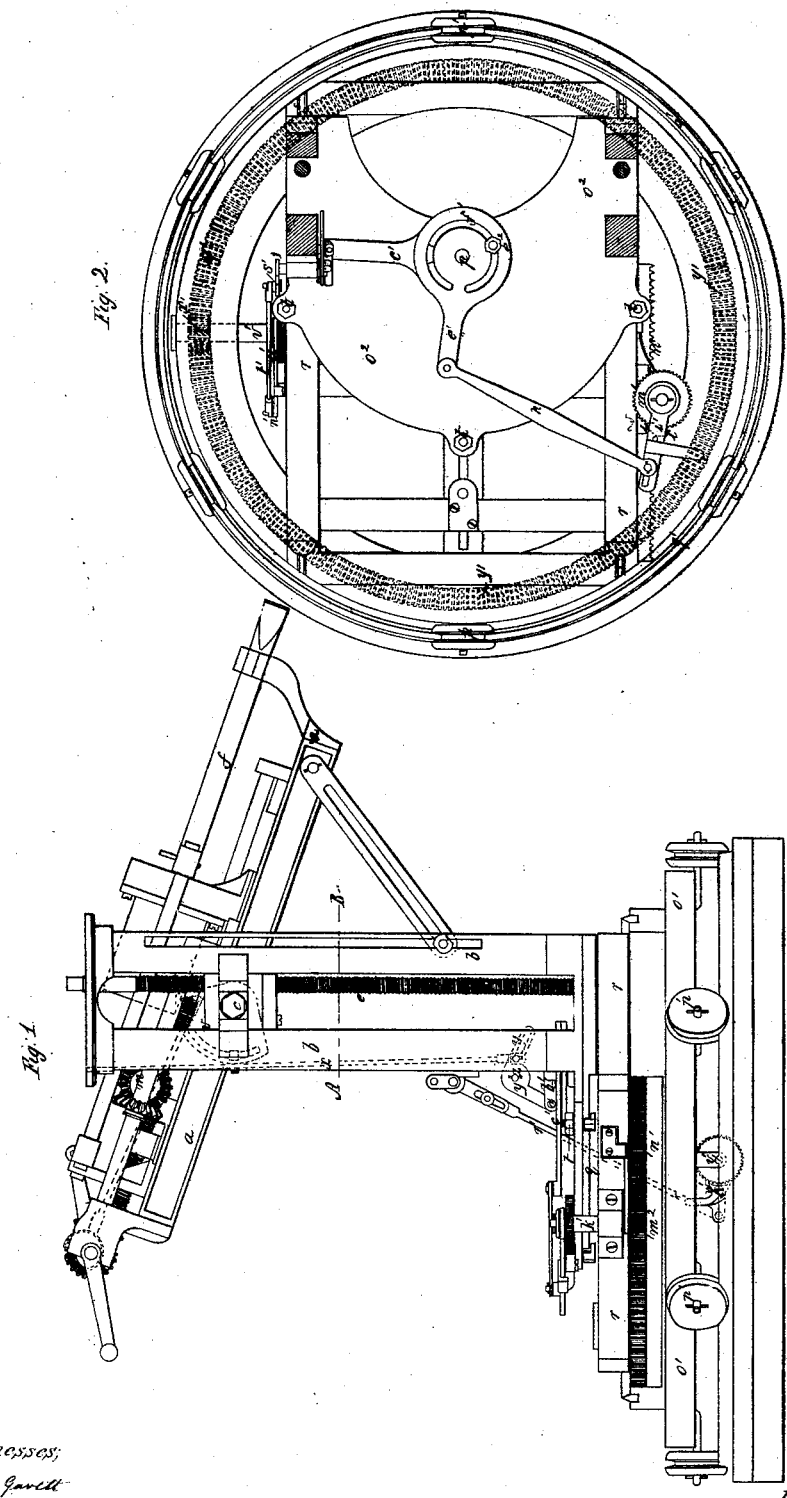

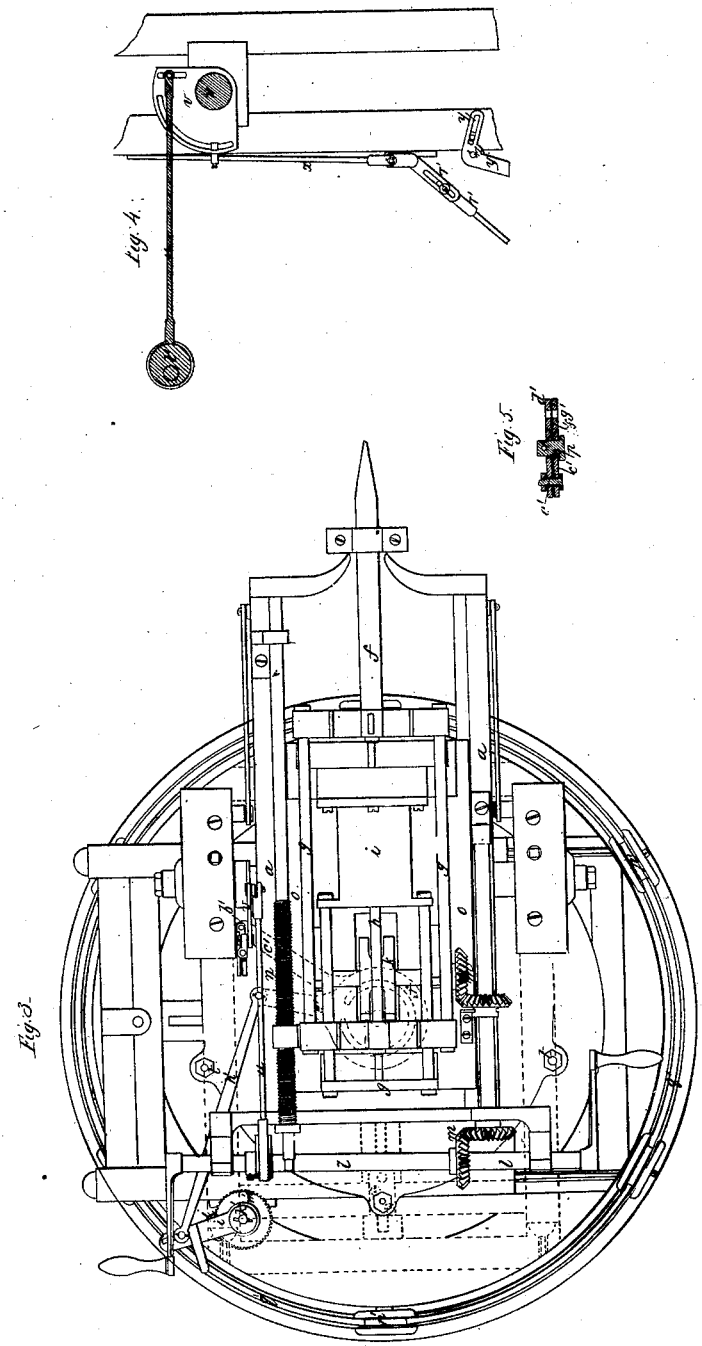

WILLIAM PLUMER, OF BOSTON, MASSACHUSETTS.

ROCK CUTTING AND DRILLING MACHINE.

Specification forming part of Letters Patent No. 18,352, dated October 6, 1857; Reissued April 13, 1869, Nos. 3,368 and 3,369.

*To all whom it may concern:*

Be it known that I, WILLIAM PLUMER, of Boston, in the county of Suffolk and State of Massachusetts, have invented certain new and useful Improvements in Machines for Cutting and Drilling Rocks, Minerals, &c., and that the following description, taken in connection with the accompanying plate of drawings, hereinafter referred to, forms a full and exact specification of the same, wherein I have set forth the nature and principles of my said improvements, by which my invention may be distinguished from others of a similar class, together with such parts as I claim and desire to have secured to me by Letters Patent.

The figures of the accompanying plates of drawings represent my improvements.

In Plate 1, Figure 1, is a side elevation of my improved machine. Fig. 2 is a horizontal section taken in the plane of the lines A B, Fig. 1. In Plate 2, Fig. 3, is a plan or top view. Figs. 4 and 5 are detail views to be hereinafter referred to.

The present invention consists in a new arrangement of devices for cutting and drilling stone, copper, &c., and more particularly for cutting out pillars and blocks of stone, marble, &c., the cutter being operated in such a manner as to work out a circular pillar of any diameter, and also to cut out a square or rectangular, or irregular shaped block, by working on all sides of the same. In the drilling machines that have previously been invented, the drill could not be fed in the required directions for cutting out a block or for following seams, but in the present machine the cutter will operate and be fed along as well horizontally at right angles to the cut, as in every other direction.

$a\ a\ a$ in the drawings represents the outer frame in which the cutting tool is supported. This frame turns upon bearings $c\ c$, in the standards $b\ b$ in such a manner that the angle of the cutting tool can be varied at pleasure, by means of the diagonal braces $d, d$ as will be readily understood. The frame $a\ a\ a$ is fed up and down by means of the feeding screws $e, e$. The cutting tool $f\ f$ is attached to a rectangular frame $g\ g$ carrying a piston $h$ that works in an air cylinder $i\ i$. The rectangular frame $g\ g$ is actuated by a cam $k$, that receives motion from the driving shaft $l\ l$, through the bevel gears $m, m$, &c. When the piston is drawn up by the cam $k$, a vacuum is produced between it and the head of the air cylinder, so that when the cam is relieved from the end bar of the frame $g\ g$, the blow will be given to the cutter $f\ f$ by the force of the air acting upon the piston. The cutter $f\ f$ is fed forward as the drilling progresses by means of a feeding screw $n$ which carries an inner sliding plate $o\ o$ that moves upon the frame $a\ a\ a$, and carries the whole drilling apparatus with it either forward or back.

I will next proceed to describe the manner in which the cutting tool is fed along horizontally and made to operate in a direction at right angles to the cut, which feature is a very important one of my improvements, as I am enabled thereby, in connection with the vertical feeding motions hereinabove described, and usually employed in drilling machines, to cut out the four sides of a block of stone or marble, and to follow the seams of the same; a result which has never before been attained.

To the standards $b\ b$ before referred to, is attached a horizontal plate $o^2\ o^2$ that turns upon a center at $p$, and rests upon a base or plate $q\ q$ attached to a frame $r\ r$ that is fed forward or back upon a track $s\ s$ as will be hereinafter explained. The horizontal plate $o^2\ o^2$ sustains the standards $b\ b$, and consequently the whole cutting apparatus, which can thus be revolved upon the bearing $p$ as a center and thereby turn the drill or cutter $f\ f$ in a direction at right angles to the track. Then the track itself and the whole machine is turned at right angles to its former position, so as to bring it parallel to the face of the stone to be cut, either by turning upon a circular track or by any other desirable means of effecting this object. The turning plate $o^2\ o^2$ is held in any desired position by screw bolts $t, t$, &c., that fasten it to the base plate $q\ q$.

The frame $r\ r$ is fed along upon the track $s\ s$, so as to feed the cutter horizontally at right angles to the cut as follows: To the driving shaft $l\ l$ is attached on eccentric $t'$, Fig. 4, which gives motion to the arm $u$, which is secured to the upper end of the slotted quadrant shaped plate $v$, Fig. 4, that turns upon a bearing at $w$. To the lower end of the quadrant plate $v$ is attached a vertical rod $x$ which receives an up and down motion and actuates the right angular lever $y\ y$, Fig. 1, that turns upon a fulcrum at $z$, one end of which lever is connected by a pivot joint at $a'$ to a short horizontal arm $b'$ fastened to the flat arm $c'\ d'$, Fig. 5. The circular end $d'$ of this arm turns upon the bearing $p$, before referred to as a center, and has a circular groove formed in it in which is inserted a screw bolt $e^2$, Fig. 5, which binds the arm $c'\ d'$ to a similar arm $e'\ f'$ having a circular groove or slot $g'$. The motion communicated to the arm $c'\ d'$ will thus by reason of the two arms being held together by the screw bolt $e'$, be imparted to the upper arm $e'\ f'$. To the arm $e'\ f'$ is attached a connecting rod $h$, which gives a forward and back motion to the horizontal arm $i'$, that turns upon the short vertical shaft $k'$, Fig. 1, attached to the frame before referred to as a center, and carries a double pawl $l'$ that engages with a ratchet wheel $m'$ made fast to the shaft $k'$. The lower part of the shaft $k'$ has on it a pinion $m^2$ that travels in a geared rack $n'$ and thereby feeds the frame $r\ r$ and consequently the whole drilling apparatus along in a horizontal direction and in the direction of the track $s\ s$. The slotted arms $c'\ d'$ and $e'\ f'$ it will be observed, are so arranged and constructed as to permit the plate $o^2\ o^2$ to be revolved, and thereby the whole cutting apparatus turned at right angles to the cut, as by loosening the screw bolt, the arm $e'\ f'$ can travel freely over the arm $c'\ d'$, by reason of the circular slots in the said arms. By tightening the screw bolt when the cutting apparatus is set in the desired position, the arms $e'\ f'$ and $c'\ d'$ are fastened together, whereby the lateral feeding movement is communicated to the whole cutting apparatus.

The drilling or cutting tool is fed backward over the track $s\ s$ by simply reversing the double pawl $l'$ as shown by dotted lines in Fig. 2.

The facility with which square blocks can be cut out will be apparent, as the side or vertical seams can be cut by feeding the cutter up or down by means of the feeding screws $e, e$, and top and bottom seams by means of the lateral horizontal movement given to the cutter.

From the foregoing description it will be seen that the desired result of feeding the cutter horizontally in a direction at right angles to the cut, is obtained by the peculiar arrangement and construction of the feeding apparatus, and the slotted arms for connecting and disconnecting the same, by the use of which arms, the plate $o^2\ o^2$ that sustain the whole machine can be freely turned into the desired position, and the lateral feeding movement after the said arms are connected, communicated to the cutting apparatus.

I will next proceed to describe the arrangement of devices by which I am enabled to cut out circular blocks pillars, &c., of marble or stone of any diameter, it being just premised that the frame $a\ a\ a$ which sustains the cutting apparatus is turned upon its bearings $c\ c$, so that the cutting tool shall stand in a vertical position. When the machine is thus employed for cutting columns, &c., the straight track $s\ s$ is firmly attached to a circular frame $o'\ o'$ furnished with grooved wheels $p'\ p'$, &c., that fit over and travel upon a raised circular track $q'\ q'$, so that the circular frame $o'\ o'$ and consequently the whole cutting apparatus will turn from a center which is the center of the track $q'\ q'$. After the cutting tool with its frame, &c., has been turned downward into a vertical position, the supporting frame $r\ r$ is moved forward on its straight track $s\ s$ until the cutting tool $f\ f$ stands at the required distance from the center of the track to describe a circle of the desired diameter of the column. The cutting tool is then made to travel and cut around this circle as follows:

The vertical rod $x$ hereinbefore referred to, is disconnected from the right angular lever $y\ y$ and connected to a bent lever arm $r'\ r'$, Fig. 4, which is connected by means of a pivot $s'$ passing through the slotted groove of the same, to a rod $t'$, Fig. 1, the lower end of which is attached by a pivot $n'$ to a short arm $u'$ which turns upon the short shaft $v'$ as a center and carries a pawl $w'$ that engages with a ratchet wheel on the shaft $v'$ and gives it an intermittent rotary motion. On the end of the short shaft $v'$ is a pinion $x'$ shown by dotted lines in Fig. 2, that is thus made to travel around upon the circular geared rack $y'\ y'$, Fig. 2, thereby causing the cutting tool to be fed as fast as the cutting progresses upon the circumference of a circle. The diameter of the circle thus cut of course can be varied at pleasure by simply feeding the frame $r\ r$ that sustains and carries the whole cutting mechanism, either forward or back the required distance, as the cutting tool will at whatever distance from the center it may be placed cut upon a circle of which the center of the circular track is the center, and the distance between the said center and the point of the cutter, the radius.

Having thus described my improvements, I shall state my claims as follows:

What I claim as my invention, and desire to have secured to me by Letters Patent is—

1. Feeding the cutter laterally in a direction at right angles to the cut or nearly so whether the cutting tool be situated horizontally, vertically, or at any angle by the devices herein described, or their equivalents, so arranged that the cutter or drill can be turned at right angles to the straight track of the machine, and also the requisite feeding motion be obtained as set forth.

2. I claim the slotted arms $c'$ $d'$ and $e'$ $f'$, so arranged and constructed as to permit the whole cutting apparatus to be turned at right angles to the cut and to communicate, when fastened together, the lateral feeding motion to the frame $r$ $r$.

3. I also claim the arrangement of devices herein described, whereby I am enabled to feed the cutter, working vertically, in a circular direction and set the cutter at any desired distance from the center upon which the machine turns, by which blocks or pillars of any desired diameter can be cut out as set forth.

WILLIAM PLUMER.

Witnesses:
EZRA LINCOLN,
JOSEPH GAVETT.

[FIRST PRINTED 1912.]